US012778007B2

(12) United States Patent
Bullis et al.

(10) Patent No.: US 12,778,007 B2
(45) Date of Patent: Nov. 3, 2026

(54) SYSTEM AND METHOD FOR PREDICTING AND ACTING UPON AIRBORNE OBSCURANT CONDITIONS RELATED TO ACTIVITY IN A WORK AREA

(71) Applicant: Deere & Company, Moline, IL (US)

(72) Inventors: Michael C. Bullis, Urbandale, IA (US); Bimal Jacob, Urbandale, IA (US); Scott J. Breiner, Dubuque, IA (US); Brett S. Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 63 days.

(21) Appl. No.: 18/888,917

(22) Filed: Sep. 18, 2024

(65) Prior Publication Data

US 2026/0076299 A1 Mar. 19, 2026

(51) Int. Cl.

| | |
|---|---|
| ***A01D 41/127*** | (2006.01) |
| ***G01N 21/94*** | (2006.01) |
| ***G06N 20/00*** | (2019.01) |

(52) U.S. Cl.

CPC ........... *A01D 41/127* (2013.01); *G01N 21/94* (2013.01); *G06N 20/00* (2019.01); *G01N 2201/0216* (2013.01)

(58) Field of Classification Search

CPC ......... A01D 41/127; B60R 1/31; E02F 9/262; E02F 9/2037; G05D 1/648; E01C 23/065; B60H 1/00378; G01S 7/487; A01B 69/004

See application file for complete search history.

(56) References Cited

U.S. PATENT DOCUMENTS

| | | | |
|---|---|---|---|
| 6,750,623 | B1 | 6/2004 | McCauley et al. |
| 7,164,118 | B2 | 1/2007 | Anderson et al. |
| 7,487,066 | B2 | 2/2009 | Sundermeyer et al. |
| 7,856,951 | B2 | 12/2010 | Kamado et al. |
| 7,953,520 | B2 | 5/2011 | Hayashi |
| 7,984,574 | B2 | 7/2011 | Pfohl et al. |
| 8,714,116 | B2 | 5/2014 | Hartman et al. |
| 9,586,473 | B2 | 3/2017 | Pfohl et al. |

(Continued)

FOREIGN PATENT DOCUMENTS

WO 2012135825 A1 10/2012

*Primary Examiner* — Yuri Kan

(74) *Attorney, Agent, or Firm* — Gary L. Montle; Lucian Wayne Beavers; Patterson Intellectual Property Law, PC

(57) ABSTRACT

A system and method are provided for predicting airborne obscurant conditions related to work machine activity in a work area. Models are developed by collecting time-series inputs for changes in airborne obscurant levels, and corresponding activity by work machines in the same work area, as correlated with observed airborne obscurant conditions comprising airborne obscurant threshold violations, intervention events, and/or a lack thereof. In association with a current operation, input signals are collected from airborne obscurant sensors having a field of view associated with the current work area, and ascertaining work machine operating parameters for work machines within or proximate to the current work area, wherein the models are used to predict airborne obscurant conditions associated with the current work area and relating to detected changes in airborne obscurant levels and corresponding activity of the work machines in the current work area. Action signals are generated corresponding to the predicted conditions.

18 Claims, 4 Drawing Sheets

(56) References Cited

U.S. PATENT DOCUMENTS

| | | | |
|---|---|---|---|
| 9,605,583 | B2 | 3/2017 | Goering et al. |
| 10,479,191 | B2 | 11/2019 | Ivey et al. |
| 11,674,288 | B2 | 6/2023 | Anderson et al. |
| 11,703,879 | B2 * | 7/2023 | Jacobus .................. G01S 7/487<br>701/23 |
| 12,297,621 | B2 * | 5/2025 | Maley ................ B60H 1/00378 |
| 2012/0043401 | A1 * | 2/2012 | Heusinger ............. E01C 23/065<br>239/722 |
| 2013/0317708 | A1 | 11/2013 | Anderson |
| 2017/0342988 | A1 | 11/2017 | Marcant |
| 2021/0310215 | A1 | 10/2021 | Kennedy et al. |
| 2021/0388579 | A1 * | 12/2021 | Kennedy ................... B60R 1/31 |
| 2023/0389458 | A1 * | 12/2023 | Ekhe .................... A01B 69/004 |
| 2024/0126260 | A1 * | 4/2024 | Davis ...................... E02F 9/262 |
| 2025/0013245 | A1 * | 1/2025 | Nishibeppu ............ G05D 1/648 |
| 2025/0250777 | A1 * | 8/2025 | Liu ....................... E02F 9/2037 |

* cited by examiner

SYSTEM AND METHOD FOR PREDICTING AND ACTING UPON AIRBORNE OBSCURANT CONDITIONS RELATED TO ACTIVITY IN A WORK AREA

FIELD OF THE DISCLOSURE

The present disclosure relates generally to systems and methods for detecting obscurant levels in a work area, and more particularly for determining the impact of work machine activity upon changes in the detected obscurant levels, obscurant conditions requiring mitigation, or lack thereof.

BACKGROUND

Weather visibility reports are conventionally known and can be utilized in work environments for ambient conditions such as fog, smoke, and the like. However, work operations in work areas, particularly those performed by large work machines in agricultural, construction, or other equivalent environments, may frequently cause or otherwise involve visibility issues associated with dust as a result of the operations. These issues can pose safety hazards for other vehicles and/or the personal health of human workers in the area (e.g., breathing issues). Even in the absence of human workers, for example where work machine operations are autonomous, the effectiveness of such operations may be negatively impacted in environmental conditions that include high levels of airborne obscurants.

Construction sites, especially in urban areas, need to keep dust levels down for compliance with government regulations and often spray their worksites to minimize the amount of dirt that is kicked up into the air.

Insurance companies for construction jobs and/or contracts also conventionally lack tools for actively monitoring visibility concerns caused by large earth moving equipment to understand jobsite safety, which affects insurance premiums.

BRIEF SUMMARY

The current disclosure provides enhancements to conventional systems and methods, at least in part by enabling or otherwise facilitating the active monitoring of changing obscurant (e.g., dust) conditions in a work area such as a construction worksite or agriculture fields.

A system and method as disclosed herein may further allow job site managers to be more proactive in identifying when they may need to spray the ground, and accordingly minimize the impacts on personal health, instead of realizing the need for mitigation long after visibility has become a concern. In addition, a system and method according to the present disclosure may provide evidence (e.g., images and/or videos of the relevant work area) of good jobsite visibility for insurance and employee safety reasons.

In one particular and exemplary embodiment, a method is disclosed herein for predicting airborne obscurant conditions related to work machine activity in a work area, the method comprising collecting time-series input data sets over time based on input signals from one or more airborne obscurant sensors having a field of view associated with a work area and corresponding work machine operating parameters for a respective one or more work machines within or proximate to the work area, and training one or more models to develop correlations between the time-series input data sets and observed airborne obscurant conditions comprising airborne obscurant threshold violations, intervention events, and/or a lack thereof. In association with a current operation of one or more work machines in a current work area, the method further comprises collecting input signals from one or more airborne obscurant sensors having a field of view associated with the current work area, collecting one or more work machine operating parameters for each of the one or more work machines within or proximate to the current work area, predicting one or more airborne obscurant conditions associated with the current work area and based upon detected changes in airborne obscurant levels and corresponding activity of at least one of the one or more work machines within or proximate to the current work area, further by reference to the developed correlations, and generating one or more action signals corresponding to the predicted one or more airborne obscurant conditions.

In one exemplary and optional aspect according to the above-referenced method embodiment, the one or more airborne obscurant sensors may comprise one or more of: cameras, laser sensors, density sensors, thermal imaging sensors, and combinations thereof.

In another exemplary and optional aspect according to the above-referenced method embodiment, the one or more airborne obscurant sensors may further comprise at least one sensor configured to generate outputs representative of an ambient environmental condition associated with the work area.

In another exemplary and optional aspect according to the above-referenced method embodiment, the ambient environmental condition may comprise one or more of: moisture, temperature, atmospheric pressure, wind speed, and combinations thereof.

In another exemplary and optional aspect according to the above-referenced method embodiment, the collected time-series input data sets may comprise characteristics of the work area, wherein input data may be collected with respect to the current work area for consideration in predicting the one or more airborne obscurant conditions.

In another exemplary and optional aspect according to the above-referenced method embodiment, the collected time-series input data sets may comprise characteristics of the operation being carried out by the one or more work machines, wherein input data may be collected with respect to the current operation for consideration in predicting the one or more airborne obscurant conditions.

In another exemplary and optional aspect according to the above-referenced method embodiment, the action signals may be generated to disable or suspend operation of at least one of the one or more work machines in the work area.

In another exemplary and optional aspect according to the above-referenced method embodiment, the collected one or more work machine operating parameters, in association with the time-series input data sets and with the current operation, may comprise one or more of: a ground speed of the respective work machine, at least one position of a ground-engaging work implement associated with the respective work machine, and combinations thereof.

In another exemplary and optional aspect according to the above-referenced method embodiment, target values for at least one of the one or more work machine operating parameters may be determined as corresponding to a desired airborne obscurant condition, wherein the action signals may be generated to automatically control the at least one of the one or more work machine operating parameters to the determined target values for at least one of the one or more work machines in the work area.

In another exemplary and optional aspect according to the above-referenced method embodiment, the action signals may be generated for displaying images of or associated with the work area on a user interface, and one or more indicia may be further displayed corresponding to at least one of the predicted one or more airborne obscurant conditions associated with the current work area.

In another exemplary and optional aspect according to the above-referenced method embodiment, the action signals may be generated to automatically actuate one or more selected air movement devices associated with the work area and/or at least one of the one or more work machines.

In another exemplary and optional aspect according to the above-referenced method embodiment, the action signals may be generated to initiate a ground surface treatment.

In another exemplary and optional aspect according to the above-referenced method embodiment, one or more selected ground surface treatment devices may be automatically actuated in association with the initiated ground surface treatment.

In another exemplary and optional aspect according to the above-referenced method embodiment, the trained models may comprise one or more of: computer vision models, machine learning models, deep learning models, and combinations thereof.

In another embodiment as disclosed herein, a system comprises data storage having stored thereon or in association therewith time-series input data sets based on input signals from one or more airborne obscurant sensors having a field of view associated with a work area and corresponding work machine operating parameters for a respective one or more work machines within or proximate to a work area, and one or more models trained to develop correlations between the time-series input data sets and observed airborne obscurant conditions comprising airborne obscurant threshold violations, intervention events, and/or a lack thereof. The system further comprises one or more processors functionally linked to the data storage and configured, in association with a current operation of one or more work machines in a current work area, to direct the performance of steps in a method according to the above-referenced method embodiment and optionally one or more of the exemplary aspects.

Numerous objects, features, and advantages of the embodiments set forth herein will be readily apparent to those skilled in the art upon reading of the following disclosure when taken in conjunction with the accompanying drawings.

DETAILED DESCRIPTION

With reference herein to the representative figures, various embodiments may now be described of an inventive system and method for predicting airborne obscurant conditions related to work machine activity in a work area, such as for example one or more large work machines capable of generating high levels of dust in a construction jobsite or an agricultural field.

Figure 1:
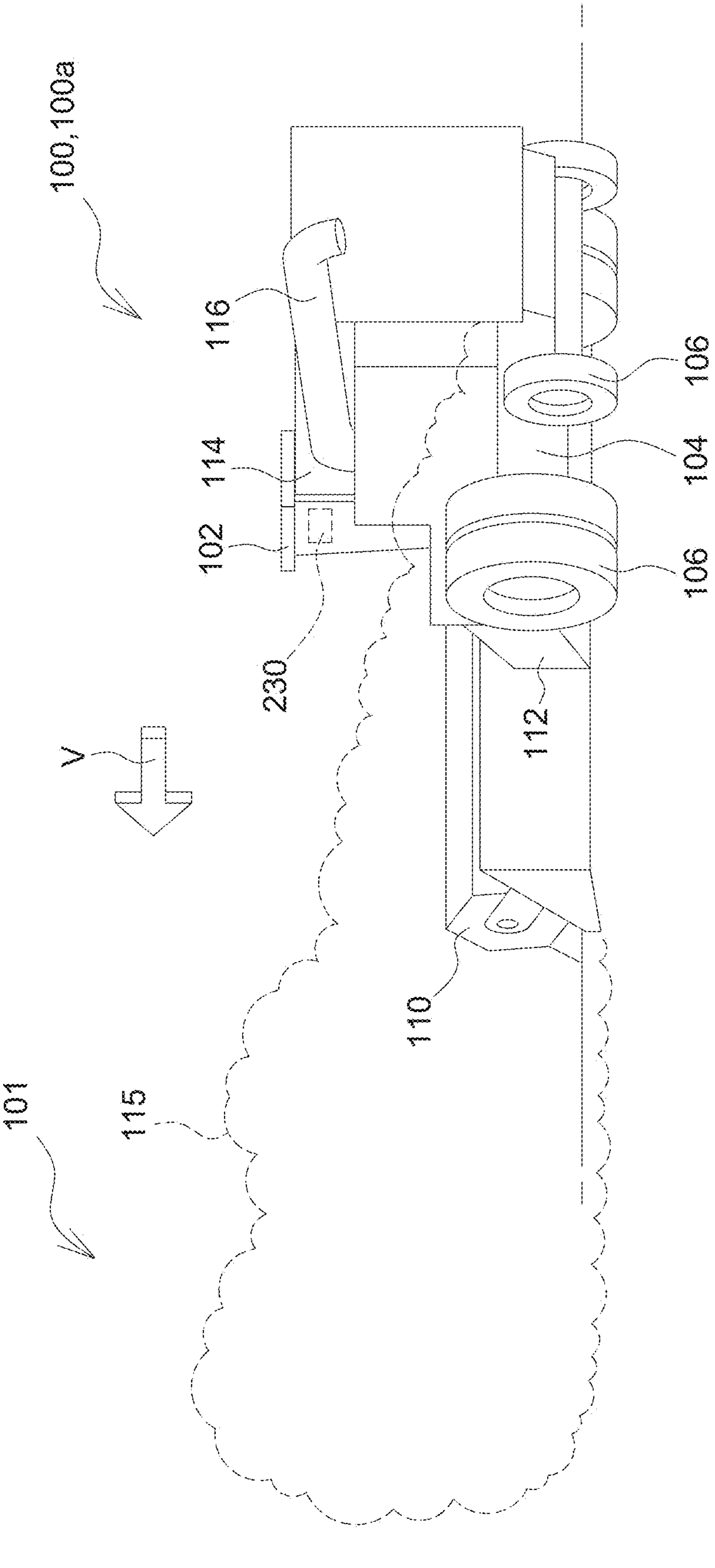
FIG. 1 is a perspective view representing an exemplary agricultural work machine traversing a work area according to an embodiment of the present disclosure.
Figure 2:
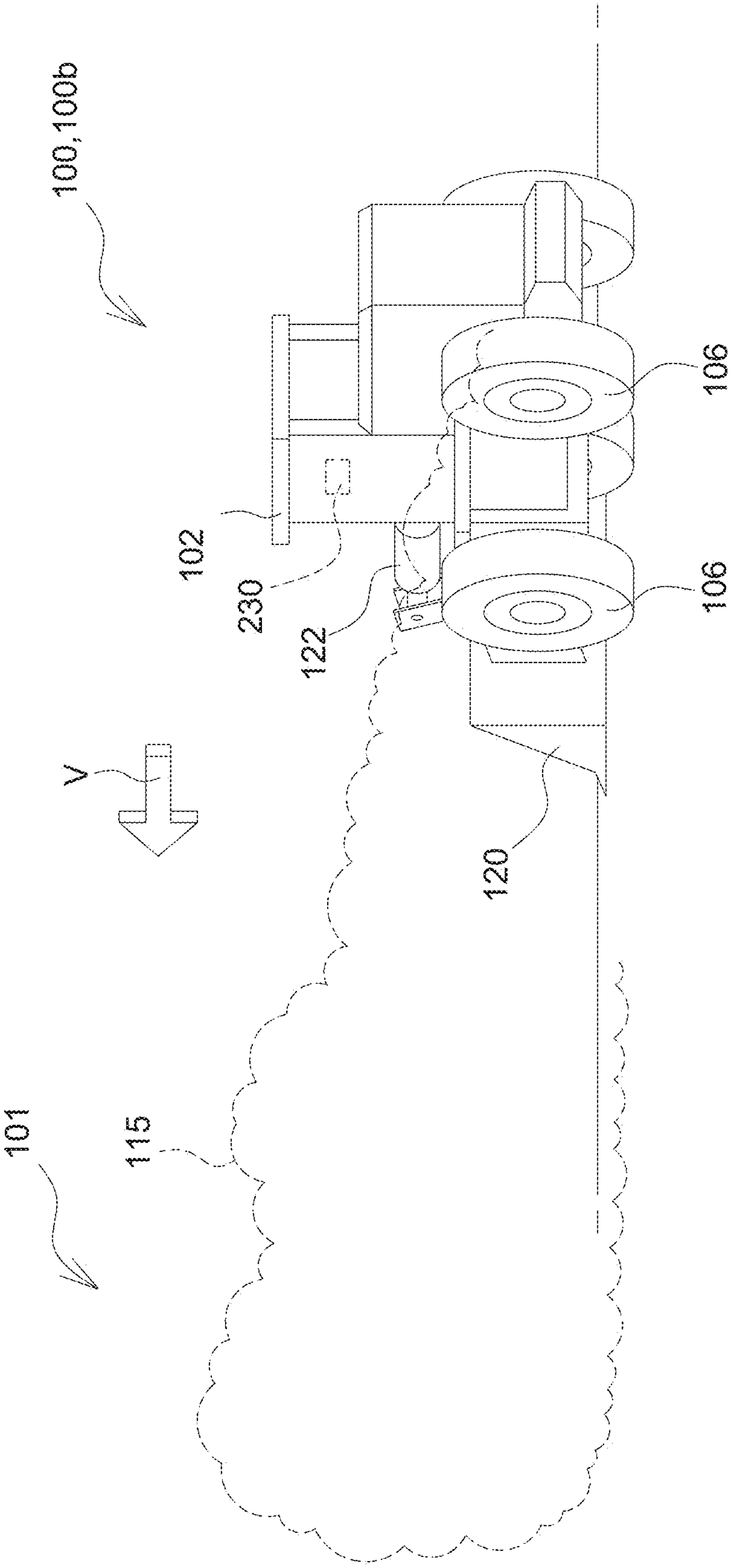
FIG. 2 is a perspective view representing an exemplary construction work machine traversing a work area according to an embodiment of the present disclosure.

Referring to FIGS. 1 and 2, two different examples of a work machine 100 are illustrated, each in the context of an embodiment of a system 200 as further described below with reference to FIG. 3.

As represented in FIG. 1, in some embodiments the work machine 100 can include an agricultural harvester **100*a* comprising a chassis 104 supported by a wheel assembly 106 (i.e., front wheels and rear wheels). An operator cab 102** can be provided at the front of the agricultural harvester, and can comprise an operator interface (not shown) or other suitable input devices which can be manipulated by the operator to change various machine settings.

As one example of a work implement, a header 110 can be coupled to the work machine 100 (i.e., agricultural harvester **100*a*) via a feeder house 112 and arranged to extend forward from the agricultural harvester 100*a*. The agricultural harvester 100*a* drives in a forward direction, as indicated by the arrow V, over a work area 101 and receives crop material from the header 110 for transfer into the feeder house 112. The feeder house 112 transfers the crop material in a grain tank 114 where it then conveyed into a grain cart or truck from a spout 116. As the agricultural harvester 100*a* travels over the work area 101 in the harvesting environment, the header 110 interaction with the crop material generates an accumulation of obscurant (i.e., an obscurant plume 115) that is predicted and/or detected by elements of the system 200**.

As represented in FIG. 2, one exemplary alternative for the work machine 100 can include a four-wheel drive loader **100*b* for operating in construction applications, but other examples of such construction-type work machines 100*b* such as excavators, skid steer loaders, graders, and the like would fall within the scope of the present disclosure. The loader 100*b* as work machine 100 in FIG. 2 is illustrated as a self-propelled vehicle having four wheels 106, but tracked or even stationary work machines 100 are also contemplated as within the scope of the present disclosure. The loader 100*b* as work machine 100 in FIG. 2 includes a bucket 120 as one example of a work implement that can be selectively moved via an actuator assembly 122 including a hydraulic cylinder between a number of positions including a ground-engaging position, for example for forward-scooping, carrying, and dumping of dirt and other materials. Other examples of suitable work implements for construction-type work machines 100*b* within the scope of the present disclosure may include, for example, blades, forks, tillers, and mowers. At least when the bucket 120 is in a ground-engaging position, further in association with the work machine 100, 100*b* traveling across the work area 101, the interaction of the bucket 120 and the wheels 106 of the work machine 100, 100*b* with the construction work area 101 generates an accumulation of obscurant (i.e., an obscurant plume 115) that is detected by the system 100**.

Although not shown in FIGS. 1 and 2, other examples of work machines 100 in other contexts besides agricultural and construction work areas may nonetheless generate accumulations of obscurants and benefit from a system 200 as disclosed herein for predicting or detecting airborne obscurant conditions and optionally (or conditionally) generating or prompting interventions based thereon, including but not limited to work machines 100 in forestry, industrial manufacturing, and the like.

In FIGS. 1 and 2, the obscurant plume 115 is shown as comprising dust. In other embodiments, the obscurant plume 115 can include, without limitation, smoke, fog, fire, snow, saw dust, vegetation parts, or others that may be generated by tire interaction with soil, chaff discharge, wind drafts across dry and bare soil, for example. In some examples, the presence of obscurant is widespread and forecastable from environmental information such as humidity, temperature, wind, and precipitation intensity. In other examples, there may not be an obscurant on or over a work area 101 until a work machine 100 moves within the work area or engages material in or on the work area 115, often creating a more localized plume of obscurant plume 115 which can also be forecast.

Obscurant availability comprises conditions naturally creating obscurants (e.g., fog) as well as those that will create obscurants as the work machine is active in the environment (e.g., dust kicked into the wind by wheels 106 of a moving work machine 100).

Figure 3:
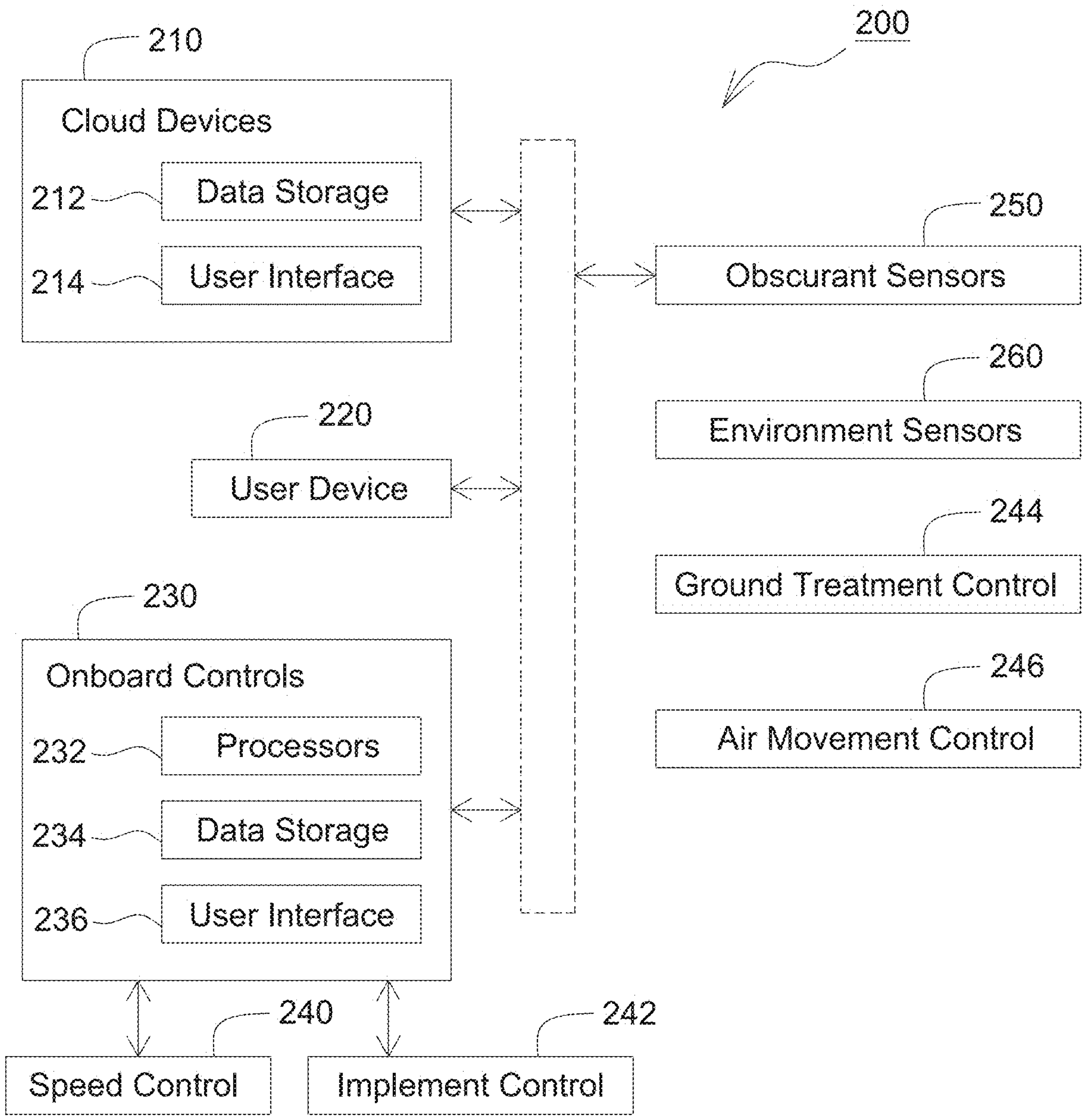
FIG. 3 is a block diagram representing an embodiment of a system according to the present disclosure.

Not expressly shown in FIGS. 1 and 2, but further described herein with reference to FIG. 3, one or more obscurant sensors 250 can be mounted to the work machine 100 in a variety of locations, for example to capture images in a narrow or wide field of view. The obscurant sensors 250 can comprise a variety of sensing devices, such as, e.g., cameras, stereo cameras, or lidar sensors, which can be used to monitor the environment around the work machine 100. Although exemplary sensing devices are discussed herein, it should be noted that the obscurant sensors 250 can comprise any other suitable sensors capable of detecting obscurants. In some embodiments, the obscurant sensors 250 can include, without limitation, laser sensors, density sensors, thermal imaging sensors, or other suitable sensors that are configured to measure obscurant attributes (e.g., optical density of the obscurant, signal attenuation, particle size distribution, or visibility distance). In other embodiments, rather than including dedicated obscurant sensors such as sensor 250, the system 200 can be configured to interface existing mitigation and sensing processing capabilities with perception sensors arranged on the work machine 102 (e.g., obstacle intelligence sensors). The obscurant sensors 250 may in some embodiments also be used for obstacle intelligence, feed-forward machine control, and/or for sensing the job quality of the work area 101.

In some embodiments, the obscurant sensors 250 can be mounted on the work machine 100 in a forward facing, rearward facing, and/or a lateral facing direction. In other embodiments, the obscurant sensors 250 can be remotely mounted, e.g., on another work machine, on a manned or unmanned aerial work machine, on a stationary pole, or any other suitable platform.

Referring further to FIG. 3, a system 200 for at least predicting and/or detecting airborne obscurant conditions may include one or more remote computing devices 210 (e.g., in a cloud computing environment), one or more user computing devices 220 (e.g., smart phones, laptops, tablet devices), and/or internal processing circuitry including or as part of an onboard controller 230 may be functionally linked via a communications network to at least the obscurant sensors 250 and can comprise any suitable data processing devices coupled for example to data storage 212, 234 which stores and makes accessible obscurant models such as obscurant source models, internal machine data, obscurant plume models, environmental data, or others. For example, the obscurant models may be accessible by the processing devices 210, 220, 230, 232 and can be used collectively with machine data or sensor data received from the obscurant sensors 250 to model obscurant characteristics.

The exemplary system 200 of FIG. 3 may include one or more ambient environment condition sensors 260 independent of the above-referenced obscurant sensors 250 and further functionally linked to one or more of the remote computing devices 210, user computing devices 220, and/or onboard controllers 230. Such ambient environment condition sensors 260 as are known in the art may be configured to provide output signals to supplement those of the obscurant sensors 250, for example to detect or otherwise enable an understanding of current environmental conditions such as wind conditions, humidity/moisture, atmospheric pressure, temperature, or the like that can impact the generation of obscurants, impact characteristics of the airborne obscurants, and/or impact the capabilities of the system to measure and/or predict the levels of airborne obscurants.

In various embodiments, the controller 230 may be part of a machine control system of the work machine 100, or it may be a separate control module. The controller 230 may be configured to directly receive input signals from the sensors 250, 260, or may receive such signals indirectly via one or more intervening components. Various of the sensors 250, 260 may typically be discrete in nature, but signals representative of more than one input parameter may be provided from the same sensor 250 or 260, and certain inputs that are otherwise described herein as being determined from signals provided by a type of sensor 250 or 260 may in some embodiments be determined from a different type of sensor 250 or 260 or from the controller 230, an electronic control unit, the machine control system, or the like.

The controller 230 may have integrated therein or otherwise generate control signals for any or all of a propulsion (ground speed) control unit 240, an implement control unit 242, and/or any other component or system that is/are consistent with work machine operations, and subject to operation, modification, or interruption by the system 200 or another system. For example, control signals may comprise a propulsion control signal or data message that controls a throttle setting, a fuel flow, a fuel injection system, vehicular speed, or vehicular acceleration. Further, where a work machine 100 may be propelled by an electric drive or electric motor, the propulsion control signal may control or modulate electrical energy, electrical current, electrical voltage provided to an electric drive or motor.

The lines that interconnect the components of the system 200 may comprise logical communication paths, physical communication paths, or both. Logical communication paths may comprise communications or links between software modules, instructions, or data, whereas physical communication paths may comprise transmission lines, data buses, or communication channels, to name non-limiting examples.

Exemplary further sensors (not shown) functionally linked to the controller 230 or other devices 210, 220 may include a position determining system and/or an obstacle detection system which individually or collectively include one or more of global navigation satellite system (GNSS) sensors, vehicle speed sensors, ultrasonic sensors, laser scanners, radar wave transmitters and receivers, thermal sensors, structured light sensors, other optical sensors, and the like within the scope of the present disclosure.

The controller 230 may further have integrated therewith or otherwise generate control signals for any or all of a ground treatment control unit 244, an air movement control unit 246, or the like for executing action signals, such as for example may be associated with an airborne obscurant condition intervention as further described below.

The controller 230 may include or otherwise be configured to produce outputs, as further described below, to a user interface 236 which may for example be associated with a display unit in the operator cab 102 for display to the human operator. The controller 230 may be configured additionally or in the alternative to produce outputs to a display unit independent of the user interface 236 such as for example a mobile user computing device 220 associated with the operator, a remote user interface 214 including for example a display unit functionally linked to one or more remote servers 210, one or more other work machines 100, etc. The controller 230 may be configured to receive inputs from the user interface 236, such as user input provided via the user interface 236.

Data transmission between, for example, the controller 230 and a remote user interface 214 may take the form of a wireless communications network and associated components as are conventionally known in the art. In certain embodiments, a remote user interface 214 and vehicle control systems for respective work machines 100 may be further coordinated or otherwise interact with a remote server 210 or other external user computing device 220 for the performance of operations in a system 200 as disclosed herein.

It may be understood that the controller 230 described herein may be a single controller having all of the described functionality, such as for example being part of a central vehicle control unit, or it may include multiple controllers wherein the described functionality is distributed among the multiple controllers.

Various operations, steps or algorithms as described in connection with the controller 230 can be embodied directly in hardware, in a computer program product such as a software module executed by the processor 232, or in a combination of the two. The computer program product can reside in data storage 234 comprising RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 232 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

A communication unit (not shown) associated with the controller 230 may support or provide communications between the controller 230 and external systems or devices, and/or support or provide communication interface with respect to internal components of the work machine 100. The communications unit may include wireless communication system components (e.g., via cellular modem, WiFi, Bluetooth, or the like) and/or may include one or more wired communications terminals such as universal serial bus ports.

Figure 4:
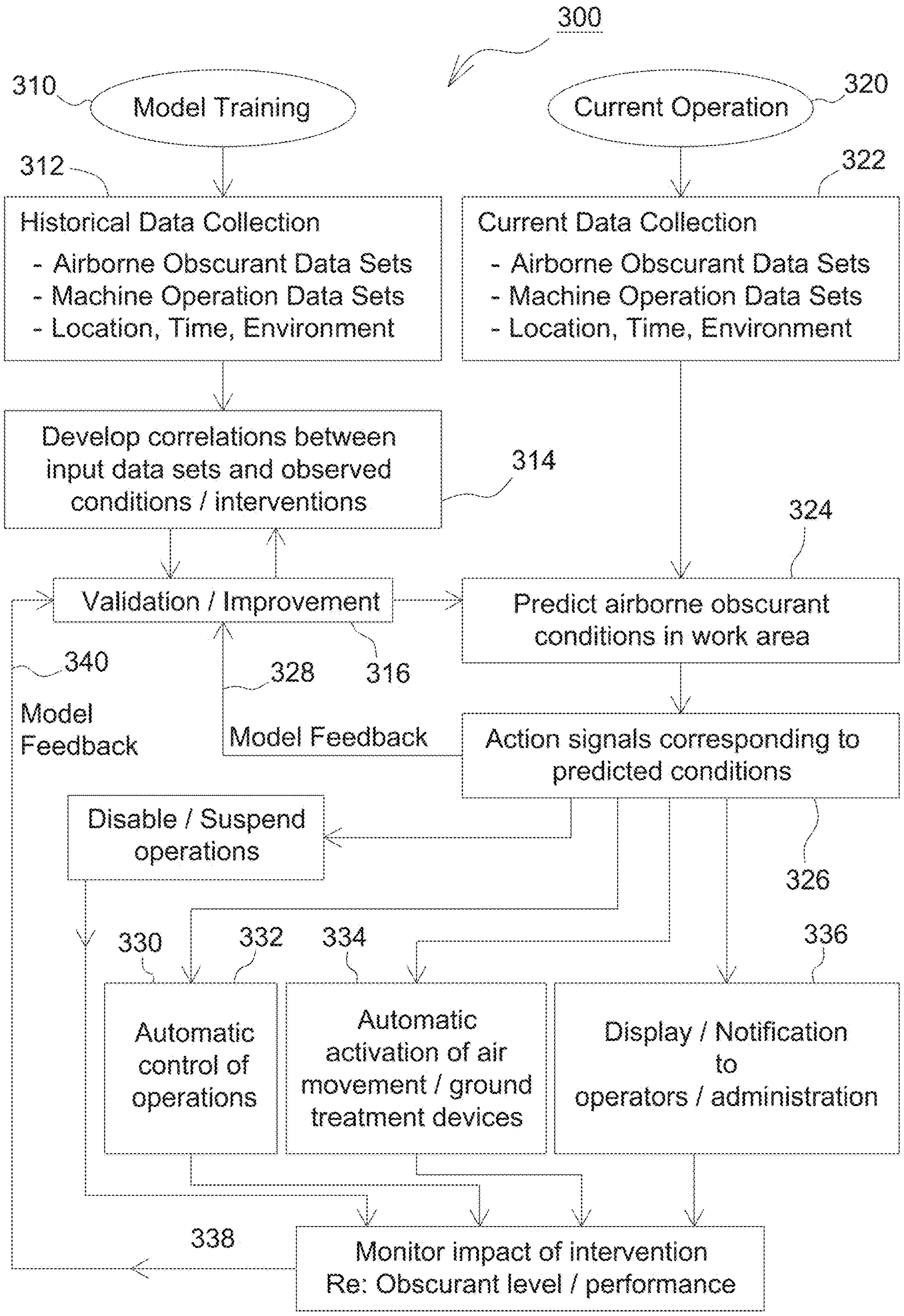
FIG. 4 is a flowchart representing an exemplary embodiment of a method as disclosed herein.

In FIG. 4, the depicted flowchart represents an exemplary embodiment of a method 300 for predicting and optionally acting upon airborne obscurant conditions related to work machine activity in a work area. For illustrative purposes, but not limiting on the scope of the systems and methods disclosed herein unless otherwise specifically noted, FIG. 4 will be described in the context of one or more work machines 100 and a system 200 as illustrated in FIGS. 1-4.

As illustrated in FIG. 4, the method 300 may include a series of steps that are performed with respect to a model training stage 310 and another series of steps that are performed with respect to a current operation of one or more work machines within a work area at issue. However, while the illustrated embodiment may include a specific arrangement of steps, inputs, outputs, and the like, it may be understood that certain steps may be combined, performed in a different order, or even omitted altogether in other embodiments within the scope of the present disclosure, unless otherwise specifically noted herein. Various steps may be described by reference to a single work machine, but it may be understood that multiple work machines of like or differing types may operate in the same work area and even communicate with each other to perform one or more steps as disclosed herein. In some embodiments, for example, steps for collecting relevant input data and/or predicting obscurant conditions may be performed by a first work machine which generates action signals for execution by a further one or more work machines for the benefit of yet another one or more additional work machines conducting operations in the work area.

As illustrated in step 312, historical input data sets may be collected over time, for example by one or more sensor devices or systems, including for example airborne obscurant data sets based on inputs signals from one or more airborne obscurant sensors, machine operation data sets for one or more work machines working within or proximate to the work area at issue, and further time-series data relating each of the above to a location, time, and other environmental data as may for example be relevant for the performance of subsequent steps.

As illustrated in step 314, the method 300 may include development of one or more models over time to correlate historical input data sets, for example corresponding to the output signals from sensor systems of the work machine and/or other work machines, with observed outcomes such as for example relating to actual airborne obscurant conditions including threshold violations, performed interventions, actual results thereof, etc. Examples of observed outcomes may for example be selected manually (for example, via input from a user interface) or even applied automatically in some embodiments based on further inputs having one or more corresponding characteristics.

Models may be iteratively trained using at least "test" input data sets and corresponding outcome labels, and in various embodiments further validated (step 316) to produce one or more airborne obscurant models which may be retrievably located in data storage for selection during a current operation based on relevant parameters. The trained and validated models may accordingly be utilized in step 324 for prediction of airborne obscurant conditions in a work area based on "current" data sets collected in step 322. The current datasets may further be utilized, for example along with current action signals and/or monitored impacts thereof as further described below, as model feedback 328, 340, and accordingly a test dataset for further training, validation, and/or improvement of the existing models.

In some embodiments, the models may include neural network-based models having variable governing parameters which are optimized during training to better simulate (or approximate in a particular simulation) observed real-life results corresponding to an input data set. Such parameters may initially be set (e.g., user-specified) before training. Tuning of the hyperparameters, or in other words optimizing the values there for, may follow during training to obtain a set of values for the parameters corresponding to an accurate input-output mapping of the neural network for the training data set. In various embodiments, tuning of parameters may be performed automatically during or between training iterations, manually based on user selection via a user interface, or combinations thereof. In some embodiments the parameters are not initially user-specified but instead predetermined formulaically or otherwise according to a "best guess" distribution of possible simulation parameters corresponding to a specified output array, and in some embodiments may initially be unknown and merely derived during training. The parameters may for example determine aspects of the neural network structure and/or training parameters, such as the number of hidden neuron layers, number and/or definition of training steps, learning rates, batch size, and the like.

As noted above, the method 300 includes a step 324 of predicting airborne obscurant conditions in the work area, based on current data sets and further optionally in view of a selectively retrieved model corresponding to the current data sets. An airborne obscurant condition may for example relate to whether or not an expected or predicted obscurant level (e.g., visibility distance) will exceed a threshold value, which can be determined in real-time or retrieved from a stored database. The threshold value may be specified manually, or associated with a type of work operation, or in some embodiments provided by the model as correlating to negative events in previous work operations.

In various embodiments, a predicted and/or detected airborne obscurant condition may correspond to visibility in the work area. In an embodiment, a predicted and/or detected airborne obscurant condition may further account for whether a change in visibility is caused by activity of one or more work machines in the work area. Accordingly, systems and methods as disclosed herein may preferably distinguish increases in airborne obscurant levels over time which correlate to work machine operations, or in other words relate to dust or other particulates which are kicked into the air as a direct result of machine activity, from airborne obscurant levels which relate at least in part to environmental conditions such as for example foggy or snowy weather, a particularly early or late time in the day, and the like.

Also as noted above, the method 300 may include in step 326 the generating of one or more action signals corresponding to at least one predicted airborne obscurant condition and at least one selected intervention event based on the at least predicted airborne obscurant condition.

The type of intervention event selected for a given predicted airborne obscurant condition may for example relate to a determined cause for the condition, such as for example where a level of airborne obscurant is expected to exceed threshold levels due to the continued activity of one or more work machines in the area, further in view of whether changes are made to how the work machines operate, or where the levels of airborne obscurant are substantially unrelated to the activities of the work machines in the area, etc.

The type of intervention event may further be selected for a given predicted airborne obscurant condition based in part on a severity of the condition, such as for example where a size of particulates in the air may result in a comparatively less safe environment. Atmospheric particulate sensors as are known in the art can be configured to detect in ppm (parts per million, or number of units of mass of a contaminant per million units of total mass) how much dust within a certain size range is in the atmosphere, and algorithms may be utilized based on specified thresholds or other standards to adjust an intervention event based on whether or not a predicted level of airborne obscurants arises to a dangerous level for the health of users in the area or merely is considered as to whether or not the work machines can function properly with the corresponding visibility.

In one embodiment, the action signals may be provided in step 330 to disable or suspend one or more operations in the work area, for example if the predicted airborne obscurant condition would render the operations unsafe for the work machine operators or others associated with the work area.

In another embodiment, the action signals may be provided in step 332 as control signals to automatically control one or more operations in the work area. As one example, a travel speed of a work machine may be reduced to account for reduced visibility, or to reduce the amount of airborne obscurant that may result from continued operation. As another example, a rotational or other movement of a work implement associated with a work machine may be adjusted to lessen the airborne obscurants to be produced by continued operation. As another example, the spout of an agricultural work machine may be positioned closer to the crop material positioned inside of the grain cart.

In another embodiment, the action signals may be provided in step 334 for automatic actuation of a ground treatment control unit 244, an air movement control unit 246, various related components, and/or or other airborne obscurant mitigation systems as may be understood within the scope of the present disclosure. Such a step 334 may be provided independently of other action signal steps 330, 332, 336 or optionally in combination with any one or more of the same.

A ground treatment control unit 244 may for example be integrated on a work machine 100, or may be a separate unit associated with the work area and selectively activated to, for example, direct water or an equivalent product onto the ground surface to reduce the amount of airborne obscurant that would result from continued operation in the work area. It may be understood that a ground treatment operation and control thereof may be replaced or supplemented with other techniques for treating a relevant surface, object, etc., as relevant to the type of operation and work area.

An air movement control unit 246 may for example be integrated on a work machine 100, or may be a separate unit associated with the work area and selectively activated to, for example, direct air through or across a work area to reduce the amount of or otherwise disperse airborne obscurant that would result from continued operation in the work area. It may be understood that an air movement operation and control thereof may be replaced or supplemented with other techniques for dispersing or otherwise mitigating the impact of existing airborne obscurant, as relevant to the type of operation and work area.

In some embodiments, action signals to initiate ground treatment and/or air movement may not take the form of control signals or prompts to ground treatment control units and/or air movement control units, respectively, but may involve the generation of messages to initiate a third party activity related to these mitigation efforts.

For example, in one or more applications wherein the work area is outdoors, the action signals may be provided for notifying or otherwise prompting a third party entity for tillage of the ground surface, chemical soil stabilization, delivery of gravel or mulch to selected portions of the work area, installation of a dust fence, and/or the like.

The action signals may be automatically generated to request an onsite visit from a water truck and corresponding service to spray at least a portion of the work area.

As additional examples, for applications wherein the work area is enclosed or otherwise at least partially indoors, the action signals may be provided for automatically calling for an exhaust fan to blow dust out of a building with small work machines operating therein (e.g., skid steer loader, compact track loader, forklift, etc.), or automatically calling for on-tool/on-attachment dust extraction and/or collection tools when such an exhaust fan engagement is not practical.

As another example relating to action signals calling for third party activity or intervention, the method may involve an automated check of an inventory for respirators onsite, and further generation of a request for delivery as needed, based at least in part on predicted airborne obscurant levels, a number of workers in the area, and a corresponding expected number of respirators needed to satisfy specified workplace safety requirements.

As another example relating to action signals calling for third party activity or intervention, the method may involve an automated and proactive call for a street sweeper, for example if required to clean cement or concrete at conclusion of the work operation, based on the predicted levels of airborne obscurants relating to the work machine activity and further for compliance with a specified construction contract, known workplace standards, or the like.

In another embodiment, the action signals may be provided in step 336 to a display unit for display of notifications and/or prompts to an operator, administrator, or other relevant user associated with the work area. Such a step 336 may be provided independently of other action signal steps 330, 332, 334 or optionally in combination with any one or more of the same.

For example, a user may be prompted to manually initiate one of the functions in steps 330, 332, or 334, or where automated functions have been initiated in association with an intervention event, a notification of the same may be generated.

As another example, a user may be prompted to manually clean one or more of the sensors 250, 260 or other sensors present on the work machine. This may simply involve an adjustment to normal maintenance procedures based on predicted heightened levels of airborne obscurant in the work area. Alternatively, this may result from a determination by the system that measured particulate levels in the air are inaccurate, or likely inaccurate, based on contamination on the sensors that requires the cleaning.

As another example, an operator may be reminded via the display to put on a respirator based on the detected and/or predicted airborne obscurant levels further in combination, for example, with the work machine being turned off or an indication from within the operator can to indicate that the operator is getting up and may be leaving the work machine, wherein the operator may be exposed to heightened levels of particulates and safety compromised thereby.

In an embodiment, an intervention event may correspond to a prediction by the system that there are no significant expected airborne obscurant levels, in which case the displayed notifications in step 336 may merely indicate that the system status is good or normal.

In such a case, the method may in addition or alternatively transmit a notification, optionally including captured images associated with the work area, to a third party user or device as an indicator that conditions are good or normal in the work area. For example, it may be desired to provide administrators, customers, insurance providers, or other interested entities with evidence of the worksite conditions, periodically or on an event-based period.

In an embodiment, the method 300 may further include a step 338 of monitoring the impact of an intervention from any one or more of steps 330, 332, 334, 336, and/or other intervention steps as may be executed, for example with respect to an amount of actual airborne obscurant within a period of time after the intervention, a rate of change in the amount of actual airborne obscurant within a period of time after the intervention, whether or not a predicted airborne obscurant level (e.g., a level in excess of a predetermined threshold) actually occurred notwithstanding execution of the commanded intervention event, etc. The monitored impact, or monitored levels in the airborne obscurant in association with the commanded action signals/intervention events, may optionally further be provided as feedback 340 to the models as previously noted herein.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of predicting airborne obscurant conditions related to particulates in the air as a result of work machine activity in a work area, the method comprising:

collecting time-series input data sets over time based on input signals, from one or more airborne obscurant sensors having a field of view associated with a work area, the input signals including measurements of airborne obscurant conditions in the field of view, and corresponding values for one or more work machine operating parameters for each of a respective one or more work machines within or proximate to the work area;

training one or more models to develop correlations between the time-series input data sets and observed airborne obscurant conditions comprising airborne obscurant threshold violations, intervention events, and/or a lack thereof; and in association with a current operation of one or more work machines in a current work area:

collecting input signals from one or more airborne obscurant sensors having a field of view associated with the current work area;

collecting current values for at least one of the one or more work machine operating parameters for each of the one or more work machines within or proximate to the current work area;

predicting one or more airborne obscurant conditions expected to occur in the current work area based upon detected changes in airborne obscurant levels and corresponding activity of at least one of the one or more work machines within or proximate to the current work area as determined via the collected values for the at least one of the one or more work machine operating parameters, further by reference to the developed correlations; and disabling or suspending operation of at least one of the one or more work machines in the work area, via one or more generated action signals, corresponding to the predicted one or more airborne obscurant conditions.

2. The method of claim 1, wherein the one or more airborne obscurant sensors comprise one or more of: cameras, laser sensors, density sensors, thermal imaging sensors, and combinations thereof.

3. The method of claim 2, wherein the one or more airborne obscurant sensors further comprise at least one sensor configured to generate outputs representative of an ambient environmental condition associated with the work area.

4. The method of claim 3, wherein the ambient environmental condition comprises one or more of: moisture, temperature, atmospheric pressure, wind speed, and combinations thereof.

5. The method of claim 1, wherein the collected time-series input data sets comprise characteristics of the work area, and wherein input data is collected with respect to the current work area for consideration in predicting the one or more airborne obscurant conditions.

6. The method of claim 1, wherein input data is collected with respect to the current operation for consideration in predicting the one or more airborne obscurant conditions.

7. The method of claim 1, wherein the collected one or more work machine operating parameters, in association with the time-series input data sets and with the current operation, comprise one or more of: a ground speed of the respective work machine, at least one position of a ground-engaging work implement associated with the respective work machine, and combinations thereof.

8. The method of claim 1, wherein the action signals are generated for displaying images of or associated with the work area on a user interface, and further displaying one or more indicia corresponding to at least one of the predicted one or more airborne obscurant conditions associated with the current work area.

9. The method of claim 1, wherein the action signals are generated to automatically actuate one or more selected air movement devices associated with the work area and/or at least one of the one or more work machines.

10. The method of claim 1, wherein the action signals are generated to initiate a ground surface treatment.

11. The method of claim 10, wherein one or more selected ground surface treatment devices are automatically actuated in association with the initiated ground surface treatment.

12. The method of claim 1, wherein the trained models comprise one or more of: computer vision models, machine learning models, deep learning models, and combinations thereof.

13. A system comprising:

data storage comprising:

time-series input data sets based on input signals from one or more airborne obscurant sensors having a field of view associated with a work area and corresponding values for one or more work machine operating parameters for each of a respective one or more work machines within or proximate to a work area; and one or more models trained to develop correlations between the time-series input data sets and observed airborne obscurant conditions comprising airborne obscurant threshold violations, intervention events, and/or a lack thereof;

one or more processors functionally linked to the data storage and configured, in association with a current operation of one or more work machines in a current work area, to:

collect input signals from one or more airborne obscurant sensors having a field of view associated with the current work area, wherein the input signals comprise measurements of airborne obscurant conditions in the field of view;

collect current values for at least one of the one or more work machine operating parameters for each of the one or more work machines within or proximate to the current work area;

predict one or more airborne obscurant conditions expected to occur in the current work area based upon detected changes in airborne obscurant levels and corresponding activity of at least one of the one or more work machines within or proximate to the current work area as determined via the collected values for the at least one of the one or more work machine operating parameters, further by reference to the developed correlations; and disable or suspend operation of at least one of the one or more work machines in the work area, via one or more action signals generated via a respective controller associated with the at least one of the one or more work machines, corresponding to the predicted one or more airborne obscurant conditions.

14. The system of claim 13, further comprising a respective controller associated with each of the one or more work machines in the work area, wherein:

the collected one or more work machine operating parameters, in association with the time-series input data sets and with the current operation, comprise one or more of: a ground speed of the respective work machine, at least one position of a ground-engaging work implement associated with the respective work machine, and combinations thereof.

15. The system of claim 13, wherein the output signals are generated for displaying images of or associated with the work area on a user interface, and further displaying one or more indicia corresponding to at least one of the predicted one or more airborne obscurant conditions associated with the current work area.

16. The system of claim 13, wherein the output signals are generated to automatically actuate one or more selected air movement devices associated with the work area and/or at least one of the one or more work machines.

17. The system of claim 13, wherein the output signals are generated to initiate a ground surface treatment, and wherein one or more selected ground surface treatment devices are automatically actuated in association with the initiated ground surface treatment.

18. A method of predicting airborne obscurant conditions related to particulates in the air as a result of work machine activity in a work area, the method comprising:

collecting time-series input data sets over time based on input signals, from one or more airborne obscurant sensors having a field of view associated with a work area, the input signals including measurements of airborne obscurant conditions in the field of view, and corresponding values for one or more work machine operating parameters for each of a respective one or more work machines within or proximate to the work area;

training one or more models to develop correlations between the time-series input data sets and observed airborne obscurant conditions comprising airborne obscurant threshold violations, intervention events, and/or a lack thereof; and in association with a current operation of one or more work machines in a current work area:

collecting input signals from one or more airborne obscurant sensors having a field of view associated with the current work area;

collecting current values for at least one of the one or more work machine operating parameters for each of the one or more work machines within or proximate to the current work area, wherein the collected one or more work machine operating parameters, in association with the time-series input data sets and with the current operation, comprise one or more of: a ground speed of the respective work machine, at least one position of a ground-engaging work implement associated with the respective work machine, and combinations thereof;

predicting one or more airborne obscurant conditions expected to occur in the current work area based upon detected changes in airborne obscurant levels and corresponding activity of at least one of the one or more work machines within or proximate to the current work area as determined via the collected values for the at least one of the one or more work machine operating parameters, further by reference to the developed correlations; and automatically controlling at least one of the one or more work machine operating parameters for at least one of the one or more work machines in the work area, via generating one or more action signals corresponding to the predicted one or more airborne obscurant conditions, to prevent the airborne obscurant levels from exceeding threshold levels.

* * * * *